Sept. 2, 1958  H. J. VOSS  2,850,053
BLOCK BAND SAW MILL
Filed April 27, 1955  2 Sheets-Sheet 1
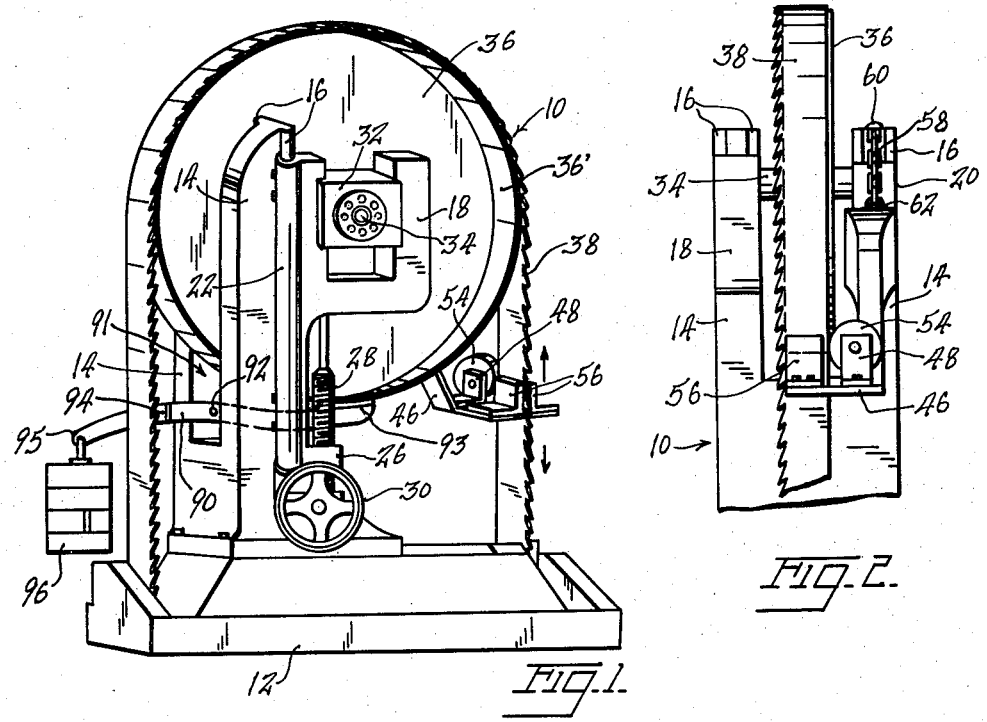
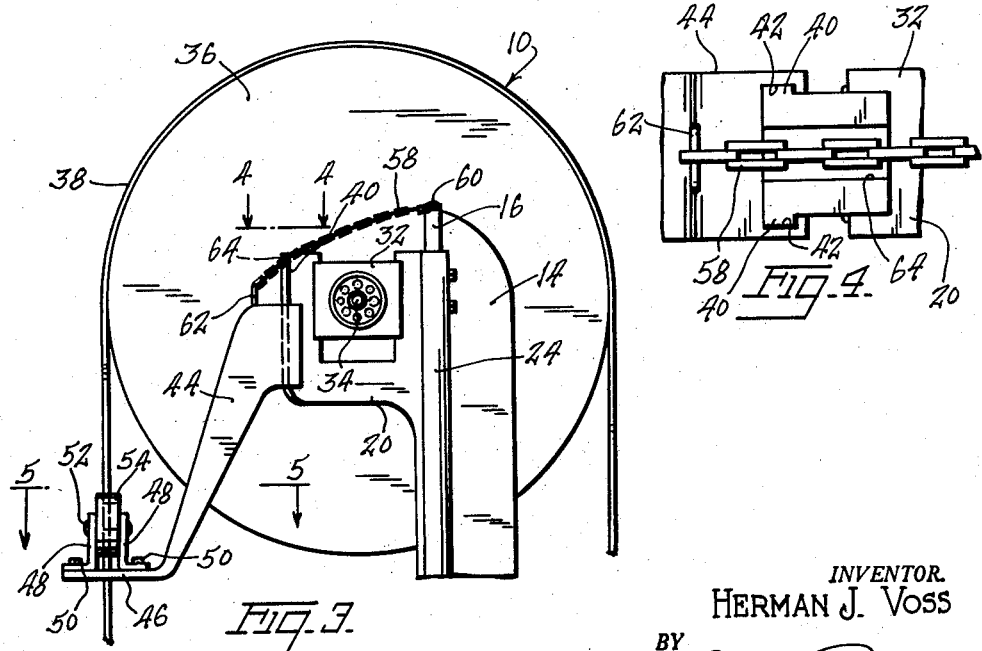
INVENTOR.
HERMAN J. VOSS
BY
ATTORNEY Sept. 2, 1958     H. J. VOSS     2,850,053
BLOCK BAND SAW MILL
Filed April 27, 1955     2 Sheets-Sheet 2
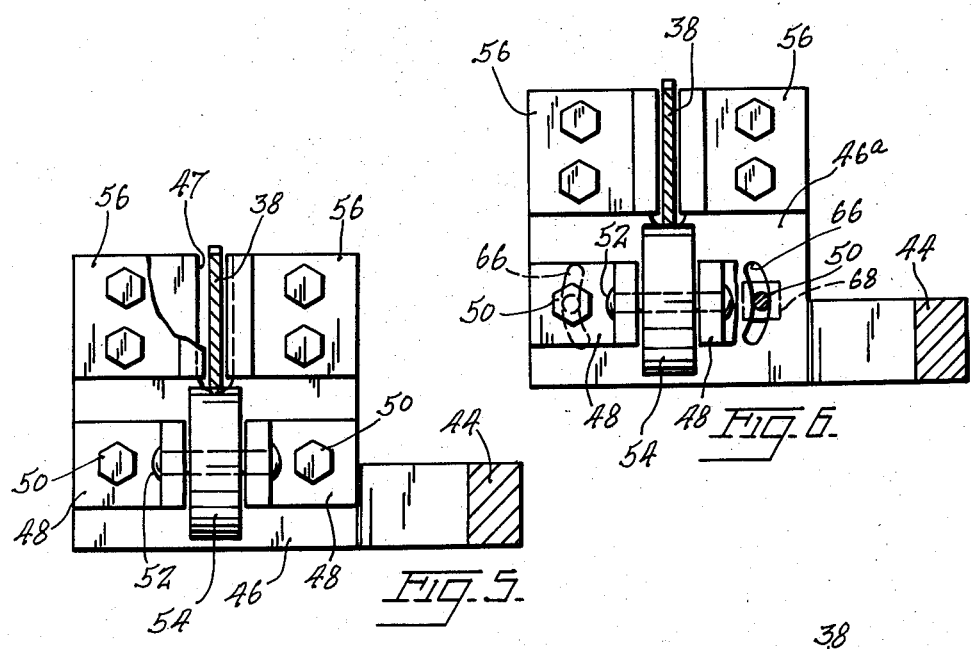
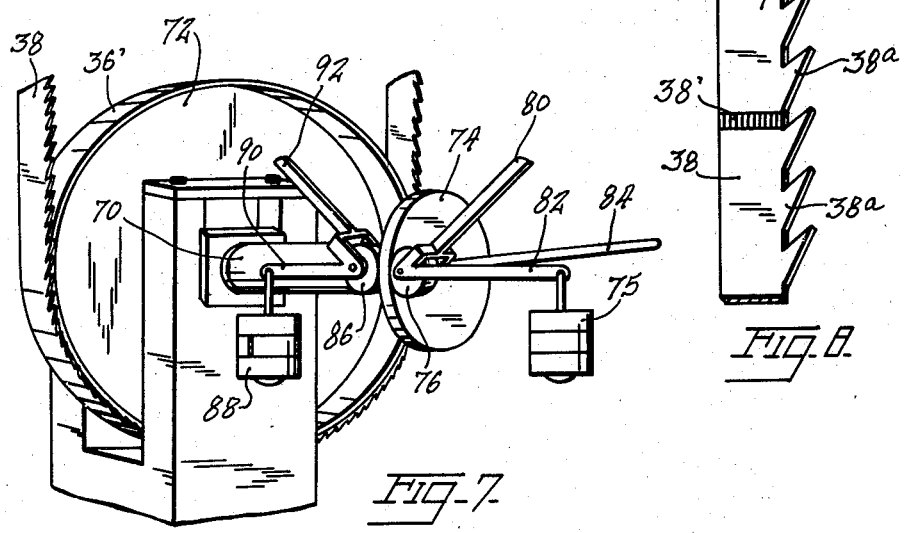
INVENTOR.
HERMAN J. VOSS
BY
ATTORNEY

2,850,053
BLOCK BAND SAW MILL

Herman J. Voss, New York, N. Y.

Application April 27, 1955, Serial No. 504,276

1 Claim. (Cl. 143—17)

This invention relates to band sawmills and, more particularly, has reference to a sawmill that is especially adapted for sawing large blocks of hard wood.

In the sawing of large blocks of strong, hard material with block band saws, one encounters not only the difficulties of ordinary sawing, namely, the necessity of cutting along curvilinear paths with a straight cut being made only infrequently, but also the difficulty in obtaining a dependable return of the saw, that is, maintenance of the blade adjacent the location at which the blade enters the material, against backward movement out of the kerf formed thereby in the material, and against lateral deviation.

In order to eliminate this difficulty, there is provided, in accordance with the present invention, at the back of the saw blade, a guide roller, the diameter being about ten inches, engaging the back edge of the blade, and supported near the upper guide disc of the band saw. Further, disposed against opposite faces of the blade at the location of the guide roller are a pair of guide jaws, which closely embrace the blade on both sides to prevent lateral deviation thereof, thus to reduce measurably the possibility of bending of the blade in cooperation with the roller, which prevents the blade from backward movement. The jaws, in accordance with the present invention, maintain the blade in a plane that insures against its slippage laterally out of engagement with the roller.

In ordinary band sawmills having an endless band saw blade passing around spaced bandwheels, it is usual to preliminarily stretch the band saw in the center parts before using it, and often during operation further stretching by repeated rolling is often found necessary. This stretching and rolling makes the material hard and stiff so that such band saws are worn out prematurely. These disadvantages are overcome in the present invention by mounting the bandwheels on strong and rugged roller bearing assemblies so that the tension between the two bandwheels is considerably increased over the tension between the bandwheels of ordinary band saws, and in practice this tension has been increased to 30,000 pounds (computed for saw blades of two mm. gauge and 21 centimeters width). In this way the tension in the saw blade is made so high that a satisfactory guiding is assured even without previous stretching or rolling. It is only necessary to slightly knock the saw blade while in tensioned condition, in the center, by placing an iron thrust support in back of it, in the event that hollow places should be noted from the outside.

With further reference to the matter of block band sawmill construction, frequently a friction disc is engaged with a main drive pulley in conventional saw construction, and is secured to a shaft, which shaft when rotated is operative to advance the clamping carriage on which the material is disposed. In conventional construction, adjacent the friction disc there is disposed a roller which is pressed against the disc. This, however, has been found to represent a deficiency in conventional saw construction, in that there is a one-sided stressing of the friction disc. Further in accordance with the present invention this deficiency is eliminated, by disposition, on that side of the friction disc opposite the conventional roller, of a freely rotatable counter roller, pressed against the opposite face of the disc with the same pressure as is used in conjunction with the conventional, single disc, thus to avoid the one-sided stressing.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a perspective view showing the upper portion of a block band sawmill equipped with blade guiding means formed according to the present invention.

Fig. 2 is an enlarged, fragmentary front elevational view, showing the guiding means as seen from the right of Fig. 1.

Fig. 3 is a side elevational view of the upper portion of the band sawmill, showing the side opposite that seen in Fig. 1.

Fig. 4 is an enlarged, detail view showing the mounting of the guiding means, as seen from line 4—4 of Fig. 3.

Fig. 5 is a detail sectional view, on an enlarged scale, on line 5—5 of Fig. 3.

Fig. 6 is a view similar to Fig. 5 showing a slightly modified construction.

Fig. 7 is a fragmentary perspective view showing the lower portion of a block band sawmill equipped with friction-disc-relieving means formed according to the present invention.

Fig. 8 is a fragmentary enlarged perspective view of the band saw blade.

In the several figures of the drawings, the reference numeral 10 has been generally applied to a block band sawmill. Such a sawmill is conventionally constructed to include a stationary stand 12, to which is bolted an upper pedestal bifurcated to include a pair of upstanding, transversely spaced arms 14 each of which is formed, along its front surface, with transversely spaced, parallel, longitudinal guide ribs 16.

Mounted for vertical sliding movement upon the respective arms 14 are U-shaped roller bearing supports or members 18, 20, respectively having pairs of guide tubes 22, 24 slidably embracing the guide ribs 16. The bearing supports 18, 20 are connected for conjoint vertical adjustment through the medium of a follower 26 rigid with the bearing supports, and threadedly engaged with a vertically disposed, threaded shank 28 rotatable, through the medium of suitable gearing, by means of a hand wheel 30.

Fixedly secured to the respective bearing supports 18, 20 are roller bearing assemblies 32, in which are journalled the opposite ends of a short, horizontally disposed upper disc shaft or arbor 34 secured to a large diameter upper flanged disc or bandwheel 36 about the peripheral flange 36' of which is trained an endless band saw blade 38 of flexible metal. The two ends of the blades 38 should preferably be annealed twice before they are soldered together at 38' (Fig. 8) to form a strong endless band saw blade. The teeth 38ª preferably are not more than 6 to 8 millimeters long. All this does not per se constitute part of the invention.

In accordance with the present invention, one of the bearing supports, namely the bearing support 20 (see Figs. 2 and 3) has, along the outer edge of that vertical leg thereof remote from the guide tubes 24, outwardly projecting, longitudinally extending guide ribs 40 complementing and engaged in inwardly facing, vertically disposed guide grooves 42 formed in the upper end of a guide assembly support arm 44, inclined downwardly and forwardly from the bearing support 20 (see Fig. 3) and integrally formed at its lower end with an outwardly projecting, horizontally disposed, rectangular bracket support plate 46. The arm 44, as shown in Fig. 5, is secured to one side of plate 46 at one end of the plate, and medially between the sides of the plate, at the other end thereof, there is provided a guide slot 47 through which the band saw blade 38 extends.

Carried by that end portion of end plate 46 to which arm 44 is integrally secured are transversely spaced, oppositely disposed, L-shaped roller support brackets 48 secured by bolts 50 to plate 46. A roller axle or pin 52 extends between the upwardly projecting portions of the brackets 48, and freely rotatable on said axle is a guide roller 54 engaging the back edge of the band saw blade 38, thus to prevent backward movement of the blade when particularly hard, strong material, such as large blocks of hard wood, is being cut.

Disposed at opposite sides of the blade 38 are blade guide brackets 56, also of L-shaped construction, secured by bolts or equivalent fastening means to the free end portion of plate 46, the upwardly projecting portions of the brackets 56 being disposed in closely spaced relation to the opposite faces of the blade 38, thus to prevent lateral movement of the blade relative to the roller 54.

A chain or other flexible element 58 is secured at one end as at 60 to the upper end of the arm 14 on which bearing support 20 is vertically adjustable, and at its other end, the chain 58 is connected by a ring 62 to the upper end of the guide assembly support arm 44. Intermediate its ends, the chain passes through an inclined guide groove 64 (Fig. 4) formed in the upper end of the outer leg of bearing support 20, that is, the leg on which the arm 44 is vertically slidable.

By reason of this arrangement, whenever the bearing support 20 is vertically adjusted, adjustment of the guide assembly in a corresponding direction will occur, in proportionate but not to exactly the same degree. For example, if bearing support 20, viewing the same as in Fig. 3, is adjusted upwardly upon arm 14 a selected distance, the arm 44, and hence the guide roller 54 and guide brackets 56, will also be adjusted upwardly, but to a slightly lesser extent, thus causing the guide assembly to be spaced a greater distance from the periphery of the upper blade support disc 36 than it would be when the bearing support is adjusted downwardly.

This is found desirable, in view of the fact that when the blade support 20 is adjusted upwardly, the tensioning of the blade 38 is correspondingly increased, since the upper disc 36 would be adjusted away from a lower blade disc such as that shown in Fig. 7. Under these circumstances, it becomes desirable to dispose the guide assembly a slightly greater distance away from the periphery of the disc, so that it will guide the blade 38 at a more crucial location, that is, a greater distance from the location at which the associated flight of blade 38 leaves the periphery of disc 36 than will be true when the bearing support 20 is adjusted downwardly to correspondingly lower the tension upon the blade 38.

Further, the chain connection is such as to permit a predetermined, vertical adjustment of the guide assembly relative to the associated bearing support, since the chain 58 can be disconnected either at 60 or 62, for engagement of a different link of the chain with the connecting rings 60, 62 carried by arm 14 and arm 44 respectively.

In Fig. 6 there is shown a slightly modified construction. This is similar in all respects to the construction already described, with the exception that in the roller support plate 46ª the bolts 50 pass not through circular openings corresponding in diameter to the diameter of the bolts, but rather, through arcuate slots 66 both struck upon a common radius, about a center which intersects perpendicularly with the axis of rotation of the roller 54, medially between the planes of the opposite sides of the roller.

By reason of this arrangement, the roller can be adjusted about the axis perpendicularly intersecting with its axis of rotation, to selected angular relationships relative to the blade 38, thus to exert a greater amount of pressure at one side of the blade than against the other, forcing the blade more firmly into engagement with one or the other of the guide brackets 56, according to the needs of the particular situation. To hold bolts 50 in the slots, the bolts have nuts 68 threaded on the lower ends thereof.

In Fig. 7 there is shown the means which has been devised to relieve one-sided stressing of a friction disc from which extends a shaft used to advance the clamping carriage on which the material to be cut is disposed. On the main drive shaft 70 of the band saw, to which is secured the lower bandwheel or disc 72, there is arranged a friction disc 74 against which a small roller 76 is pressed under the action of a weight 75. The roller 76 is supported by a swinging arm 80 while the weight 75 presses, by means of an arm 82, the roller 76 against the disc 74. From the roller 76, the turning movement is transmitted by means of a shaft 84 to the carriage, not shown, on which the blocks or logs of wood are supported. This is conventional construction in the band saw mill, considered per se.

In accordance with the invention, on the opposite side of disc 74, a second roller 86 is arranged which is pressed by a swinging weight 88, weighing the same as weight 75, against the disc 74, by means of levers 90, 92, whereby the disc 74 is protected against a one-sided loading or stressing on the part of a pressing roller.

Means for applying additional tension to the upper bandwheel 36 may also be provided by lever means 90 extending through the space 91 between the arms 14 below the bandwheel and pivotally supported midway its ends on a pivot pin 92 supported between the arms 14. The inner end of the lever means is enlarged to form a shoe 93 having flexible material on its surface, said shoe being disposed in alignment with and close to the peripheral flange 36' of the bandwheel. The lever means, where it outwardly leaves the space between the arms, extends at right angles to the plane of the bandwheel as indicated at 94 and then continues on a plane parallel to the plane of the bandwheel as indicated at 95. A counterweight 96 carried on the outer extremity of the lever means continuously tensions the shoe 93 upwardly against the outer periphery of the flange 36' on the bandwheel.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

In a block band saw mill, a guide for a flat band saw blade, comprising a bifurcated pedestal, one of the bifurcations of the pedestal having a longitudinally disposed rib, a split tube slidably embracing said rib, a U-shaped bearing support having one arm integrally formed with said split tube, with the other arm vertically disposed and spaced from said one arm, said support being adapted to slidably support a roller bearing assembly and arbor for said band saw blade between the arms of said bearing support, said other arm being formed with outwardly projecting longitudinally extending guide ribs, a guide assembly support arm having an upper end formed with vertically disposed grooves, said guide ribs being engaged in said grooves, said guide assembly support arm being inclined downwardly and forwardly from said upper end thereof and from the bearing support, said support arm having its other and lower end formed with an outwardly projecting horizontally disposed rectangular bracket support plate, said plate having a medially disposed guide slot for said band saw blade, a pair of transversely spaced, L-shaped roller support brackets carried by said plate, a roller for guiding the back edge of said blade rotatably carried by said brackets, a pair of vertically disposed L-shaped blade guide brackets carried by said plate on opposite sides of said slot therein to prevent lateral movement of the blade relative to the roller, a first ring secured at the upper end of said guide assembly support arm, a second ring secured at the upper end of said pedestal, the upper end of said other arm having an inclined groove therein at its upper end, and a chain connected between the first and second ring and passing through said groove for adjustably positioning said guide assembly support arm with respect to said roller bearing assembly and arbor as the latter is vertically adjusted on said pedestal.

References Cited in the file of this patent

UNITED STATES PATENTS

| | | |
|---|---|---|
| 62,995 | Bossett et al. | Mar. 19, 1867 |
| 129,553 | Hart | July 16, 1872 |
| 278,936 | Groves | June 5, 1883 |
| 381,466 | Dickerson | Apr. 17, 1888 |
| 437,490 | Hanson | Sept. 30, 1890 |
| 575,416 | Connell | Jan. 19, 1897 |
| 588,653 | Pelton | Aug. 24, 1897 |
| 616,219 | Wilkin | Dec. 20, 1898 |
| 768,707 | Thomas | Aug. 30, 1904 |
| 798,569 | Cleveland | Aug. 29, 1905 |
| 836,446 | Kaudela | Nov. 20, 1906 |
| 1,649,611 | McPherson | Nov. 15, 1927 |
| 1,866,395 | Campbell | July 5, 1932 |
| 2,059,595 | McKeage | Nov. 3, 1936 |
| 2,590,898 | Smith | Apr. 1, 1952 |
| 2,700,402 | Walden | Jan. 25, 1955 |

FOREIGN PATENTS

| | | |
|---|---|---|
| 139,842 | Germany | Apr. 2, 1903 |
| 553,223 | France | Feb. 7, 1923 |